(12) United States Patent
Fensel et al.

(10) Patent No.: US 8,512,508 B2
(45) Date of Patent: *Aug. 20, 2013

(54) LOW VOLATILE ADHESIVE FOR ROOFING SYSTEMS

(75) Inventors: Fred A. Fensel, Shaker Heights, OH (US); Jason D. Smith, Strongsville, OH (US)

(73) Assignee: Garland Industries, Inc., Cleveland, OH (US)

( * ) Notice: Subject to any disclaimer, the term of this patent is extended or adjusted under 35 U.S.C. 154(b) by 567 days.

This patent is subject to a terminal disclaimer.

(21) Appl. No.: 12/794,934

(22) Filed: Jun. 7, 2010

(65) Prior Publication Data

US 2010/0236714 A1    Sep. 23, 2010

Related U.S. Application Data

(63) Continuation of application No. 11/580,040, filed on Oct. 4, 2006, now Pat. No. 7,772,301.

(51) Int. Cl.
*C09J 195/00* (2006.01)
*C09J 175/04* (2006.01)

(52) U.S. Cl.
USPC .......... 156/337; 427/138; 427/372.2; 428/141

(58) Field of Classification Search
USPC .............. 156/337; 427/138, 372.2; 428/141
See application file for complete search history.

(56) References Cited

U.S. PATENT DOCUMENTS

| | | | |
|---|---|---|---|
| 3,980,597 A | 9/1976 | Shihadeh | |
| 7,317,051 B2 * | 1/2008 | Georgeau et al. | 524/837 |
| 7,452,930 B2 * | 11/2008 | Kawakami et al. | 524/70 |

* cited by examiner

*Primary Examiner* — Peter Szekely
(74) *Attorney, Agent, or Firm* — Fay Sharpe LLP

(57) ABSTRACT

A bitumen based adhesive that includes asphalt and/or coal tar and at least one silylated polymer and/or silyl-terminated polymer. The bitumen based adhesive can also include a plasticizer.

18 Claims, No Drawings

LOW VOLATILE ADHESIVE FOR ROOFING SYSTEMS

The present invention is a continuation of U.S. patent application Ser. No. 11/580,040 filed Oct. 4, 2006 now U.S. Pat. No. 7,772,301.

The present invention is directed to a low volatile adhesive, and more particularly to a low volatile adhesive that can be used to adhere structures to a roof and/or siding of a building.

BACKGROUND OF THE INVENTION

There is a current trend in the industry to limit the amount of volatile components in various types of products. The EPA and various state and local legislators have proposed or passed rules and regulations to limit the amount of volatile compounds that can be released in various industry applications. In the rooking industry s is common to adhesively bond roof membranes to a roof substrate by the use of hot asphalt, or flammable solvent based contact bond adhesives. Hot asphalts and solvent-based adhesives typically release large amounts of volatile compounds into the atmosphere during application of the adhesives on a roofing system. These volatile compounds are also typically flammable, thus requiring several safety precautions when applying the adhesive to the roof system. The volatile compounds can also become trapped below a roof membrane, thus cause blisters and delamination of the roof membrane. Sprayable polyurethane foam adhesives are also commonly used as adhesive for roofing systems. Spraying the polyurethane adhesive produces a potentially hazardous aerosol, requiring use of protective suits, respiratory protection, or the like in order to protect those spraying the adhesive and applying the roof membrane. These aerosols can also include compounds that are undesirable for the environment.

In view of the current state of the art there is a need for an asphalt or bitumen based adhesive having a very low volatile content which can be used to adhesively secure a roof membrane to a roof substrate.

SUMMARY OF THE INVENTION

The present invention is directed to a bitumen based adhesive having a very low volatile content. The bitumen based adhesive is particularly formulated for use in roofing applications to secure a roof membrane or the like to a roofing substrate or other roofing structure. Although the invention will be particularly described with respect to roofing applications, it will be appreciated that the adhesive can be used in many other non-roofing applications (e.g., flooring applications, siding applications, etc.). In one non-limiting embodiment of the present invention, the bitumen based adhesive is used to secure one or more roof membranes to a roof substrate. The roof membrane can include a layer of "fleece" (non-woven textile) material; however, this is not required. In an additional and/or alternative non-limiting embodiment of the present invention, the bitumen based adhesive includes 1) asphalt and/or coal tar and 2) silylated polymer and/or silyl-terminated polymer.

In an additional and/or alternative non-limiting aspect of the present invention, the bitumen based adhesive includes at least about 5 weight percent bitumen. The bitumen can be formed of single type of asphalt or coal tar or be formed of a blend of one or more asphalts and/or coal tars. The bitumen used in the adhesive generally has an average softening point of at least about 100° F. In one non-limiting embodiment of the invention, the based adhesive includes at least about 8 weight percent bitumen. In an additional and/or alternative non-limiting embodiment of the invention, the bitumen based adhesive includes at least about 10 weight percent bitumen. In still an additional and/or alternative non-limiting embodiment of the invention, the bitumen based adhesive includes about 10-30 weight percent bitumen. In yet an additional and/or alternative non-limiting embodiment of the invention, the bitumen based adhesive includes about 12-20 weight percent bitumen. In still yet an additional and/or alternative non-limiting embodiment of the invention, the average softening point of the bitumen is at least about 90° F. In an additional and/or alternative non-limiting embodiment of the invention, the average softening point of the bitumen is at least about 100° F. In still an additional and/or alternative non-limiting embodiment of the invention, the average softening point of the bitumen is at least about 125° F. In yet an additional and/or alternative non-limiting embodiment of the invention, the average softening point of the bitumen is about 140-190° F. In still an additional and/or alternative non-limiting embodiment of the invention, the average softening point of the bitumen is about 145-160° F. The inclusion of bitumen in the adhesive has several believed functions such as, but not limited to, 1) a colorant, 2) an extender, 3) a reactant diluent, and/or 4) a weather resistant enhancing agent. As can be appreciated, the bitumen can have other or additional functions in the bitumen based adhesive.

In still an additional and/or alternative non-limiting aspect of the present invention, the bitumen based adhesive includes at least about 5 weight percent silylated polymer and/or silyl-terminated polymer. Non-limiting examples of silyl-terminated polymer that can be used in the bitumen based adhesive includes, but is not limited to silylated polyurethane, silylated polyethers, and/or silylated polyesters. The silylated polymer and/or silyl-terminated polymer is generally a substantially non-volatile polymer. In one non-limiting embodiment of the invention, the bitumen based adhesive includes about 5-70 weight percent silylated polymer and/or silyl-terminated polymer. In an additional and/or alternative non-limiting embodiment of the invention, the bitumen based adhesive includes about 10-60 weight percent silylated polymer and/or silyl-terminated polymer. In still an additional and/or alternative non-limiting embodiment of the invention, the bitumen based adhesive includes about 15-50 weight percent silylated polymer and/or silyl-terminated polymer. In yet an additional and/or alternative non-limiting embodiment of the invention, the bitumen based adhesive includes about 20-40 weight percent silylated polymer and/or silyl-terminated polymer. In still yet an additional and/or alternative non-limiting embodiment of the invention, the bitumen based adhesive includes about 25-35 weight percent silylated polymer and/or silyl-terminated polymer. In an additional and/or alternative non-limiting embodiment of the invention, the silylated polymer and/or silyl-terminated polymer includes at least two silyl groups. In one non-limiting aspect of this embodiment, at least one silylated polymer and/or silyl-terminated polymer is an alpha, omega-telechelic silane-terminated polymer. Non-limiting examples of silylated polymer and/or silyl-terminated polymer that can be used in the asphalt or bitumen based adhesive are disclosed in U.S. Pat. No. 6,579,924, which is incorporated herein by reference. In an additional and/or alternative non-limiting embodiment of the invention, the total weight percent of silylated polymer and/or silyl-terminated polymer in the bitumen base adhesive is greater that the total weight percent of bitumen in the bitumen base adhesive; however, this is not required. In one non-limiting aspect of this embodiment, the weight percent ratio of silylated polymer and/or silyl-terminated polymer in the bitumen base adhesive to bitumen in the bitumen base adhesive is at least about 1.05:1. In an additional and/or alternative non-limiting aspect of this embodiment, the weight percent ratio of silylated polymer and/or silyl-terminated polymer in the bitumen base adhesive to bitumen in the bitumen base adhesive is at least about 1.1:1. In still an additional and/or alternative non-limiting aspect of this embodiment, the weight percent ratio of silylated polymer and/or silyl-terminated polymer in the bitumen base adhesive to bitumen in the bitumen base adhesive is at least about 1.2:1. In yet an additional and/or alternative non-limiting aspect of this embodiment, the weight percent ratio of silylated polymer and/or silyl-terminated polymer in the bitumen base adhesive to bitumen in the bitumen base adhesive is about 1.15-4:1. In still yet an additional and/or alternative non-limiting aspect of this embodiment, the weight percent ratio of silylated polymer and/or silyl-terminated polymer in the bitumen base adhesive to bitumen in the bitumen base adhesive is about 1.2-2:1.

In still yet an additional and/or alternative non-limiting aspect of the present invention, the bitumen based adhesive can include a plasticizer. The plasticizer is generally added to lower the viscosity and/or improve the penetration features of the bitumen base adhesive. The plasticizer can also act as a solvent; however, this is not required. In one non-limiting embodiment of the invention, the plasticizer includes plasticizers in the phthalic acid group. Such plasticizers include, but are not limited to, dioctyl adipate (DOA), dioctyl phthalate (DOP), diisononyl phthalate (DINP), diisodecyl phthalate (DIDP). In one non-limiting aspect of this embodiment, the bitumen base adhesive includes diethylhexyl phthalate. In an additional and/or alternative non-limiting embodiment of the invention, the weight percent of plasticizer in the bitumen based adhesive is at least about 5 weight percent. In one non-limiting aspect of this embodiment, the weight percent of plasticizer in the bitumen based adhesive is at least about 10 weight percent. In an additional and/or alternative non-limiting aspect of this embodiment, the weight percent of plasticizer in the bitumen based adhesive is about 10-40 weight percent. In still an additional and/or alternative non-limiting aspect of this embodiment, the weight percent of plasticizer in the bitumen based adhesive is about 10-30 weight percent. In yet an additional and/or alternative non-limiting aspect of this embodiment, the weight percent of plasticizer in the bitumen based adhesive is about 15-25 weight percent. In still an additional and/or alternative non-limiting embodiment of the invention, the weight percent of plasticizer in the bitumen based adhesive is greater than the weight percent of the bitumen in the bitumen base adhesive; however, this is not required. In one non-limiting aspect of this embodiment, the weight percent ratio of plasticizer in the bitumen based adhesive to weight percent of the bitumen in the bitumen base adhesive is at least about 1.01:1. In an additional and/or alternative non-limiting aspect of this embodiment, the weight percent ratio of plasticizer in the bitumen based adhesive to weight percent of the bitumen in the bitumen base adhesive is at least about 1.05:1. In still an additional and/or alternative non-limiting aspect of this embodiment, the weight percent ratio of plasticizer in the bitumen based adhesive to weight percent of the bitumen in the bitumen base adhesive is about 1.05-2:1. In yet an additional and/or alternative non-limiting aspect of this embodiment, the weight percent ratio of plasticizer in the bitumen based adhesive to weight percent of the bitumen in the bitumen base adhesive is about 1.1-1.6:1. In still yet an additional and/or alternative non-limiting aspect of this embodiment, the weight percent ratio of plasticizer in the bitumen based adhesive to weight percent of the bitumen in the bitumen base adhesive is about 1.15-1.4:1.

In still yet an additional and/or alternative non-limiting aspect of the present invention, the bitumen based adhesive can include dehydrating agent, compatibilizer, tackifier, stabilizer, filler, antioxidant, adhesion promoter, ultraviolet absorber, metal deactivator, antioxidant, light stabilizer, thixotropic agent, catalyst, amine type radical chain inhibitor, phosphorus-containing peroxide decomposer, lubricant, pigment, foaming agent, anti-foaming agent flame retardant and/or antistatic agent.

In an additional and/or alternative non-limiting aspect of the present invention, there is provided a method of preparing the bitumen based adhesive. In one non-limiting embodiment of the invention, bitumen based adhesive is formed by 1) heating the bitumen above its softening point. 2) adding one or more plasticizers to the melted bitumen and mixed therein, and 3) add silylated polymer and/or silyl-terminated polymer to the mixture of bitumen and plasticizer and mix the components together to form the bitumen based adhesive. In an additional and/or alternative non-limiting embodiment of the invention, a filler is added to the bitumen prior to the addition of the silylated polymer and/or silyl-terminated polymer. In still an additional and/or alternative non-limiting embodiment of the invention, a 0.5-1:1 weight ratio of plasticizer to bitumen is initially mixed together and then any additional plasticizer is subsequently mixed with the bitumen prior to the addition of the silylated polymer and/or silyl-terminated polymer. In yet an additional and/or alternative non-limiting embodiment of the invention, antioxidant and/or thixotrope is added to the bitumen prior to the addition of the silylated polymer and/or silyl-terminated polymer. In still yet an additional and/or alternative non-limiting embodiment of the invention, dehydration agent, adhesion promoter, and/or catalyst is added to the bitumen after the addition of the silylated polymer and/or silyl-terminated polymer. In an additional and/or alternative non-limiting embodiment of the invention, the bitumen based adhesive is sealed in a container under an inert environment. In still an additional and/or alternative non-limiting embodiment of the invention, one or more mixing steps used to form the bitumen based adhesive is performed under at least a partial vacuum.

In still an additional and/or alternative non-limiting aspect of the present invention, there is provided a method of securing one or more layers of roof membrane on a roof substrate by use of a bitumen based adhesive having low volatile properties. In one non-limiting embodiment of the present invention, the bitumen based adhesive is applied to a roof substrate and/or a roof membrane (e.g., modified bituminous membrane (SBS base sheet or SBS cap sheet)). The roof membrane, when used, can include a layer of "fleece" (non-woven textile) material disposed on one side thereof; however, this is not required. After bitumen based adhesive is applied to a roof substrate and/or a roof membrane, a roof membrane is applied on the top surface of the bitumen base adhesive. The bitumen based adhesive is then allowed to cure to thereby secure the roof membrane to the roof substrate or other roof membrane. The bitumen based adhesive can be a moisture curing, substantially non-volatile adhesive. The bitumen based adhesive can be applied to the roof substrate and/or a roof membrane in discrete locations on the roof substrate and/or a roof membrane or be applied to substantially the complete surface of the roof substrate and/or a roof membrane.

It is one non-limiting object of the present invention to provide a bitumen based adhesive that has low volatility properties.

It is an additional and/or alternative non-limiting object of the present invention to provide a bitumen based adhesive that includes 1) asphalt and/or coal tar and 2) silylated polymer and/or silyl-terminated polymer.

It is still an additional and/or alternative non-limiting object of the present invention to provide a bitumen based adhesive that includes a plasticizer.

It is yet an additional and/or alternative non-limiting object of the present invention to provide a bitumen based adhesive that can be used to adhere a roof membrane to a roof substrate or another roof membrane.

These and other advantages will become apparent to those skilled in the art upon the reading and following of this description.

DETAILED DESCRIPTION OF THE INVENTION

Referring now to disclosure set forth below which describes preferred embodiments of the invention only and is not for the purpose of limiting the same, there is proved a bitumen base adhesive that releases little, if any, volatiles during the application and curing of the adhesive. The bitumen base adhesive includes asphalt and/or coal tar and 2) silylated polymer and/or silyl-terminated polymer. Non-limiting examples of the bitumen base adhesive are set forth below:

Example A

| Component | Weight Percent |
|---|---|
| Bitumen | 10-30 |
| Silylated polymer and/or silyl-terminated polymer | 15-60 |
| Plasticizer | 10-30 |
| Catalyst | up to 10 |

Example B

| Component | Weight Percent |
|---|---|
| Bitumen | 12-25 |
| Silylated polymer and/or silyl-terminated polymer | 20-45 |
| Plasticizer | 12-26 |
| Adhesion Promoter | 0-1 |
| Antioxidant | 0-1 |
| Catalyst | 0-1 |
| Dehydration Agent | 0-3 |
| Filler | 0-50 |
| Pigment | 0-50 |
| Thixotropic Agent | 0-10 |

Example C

| Component | Weight Percent |
|---|---|
| Asphalt | 12-22 |
| Silylated polymer and/or silyl-terminated polymer | 22-35 |
| Plasticizer | 14-22 |
| Adhesion Promoter | 0-0.5 |
| Antioxidant | 0-0.5 |
| Catalyst | 0-0.5 |
| Dehydration Agent | 0-1.5 |
| Filler | 0-40 |
| Pigment | 0-40 |
| Thixotropic Agent | 0-5 |

Example D

| Component | Weight Percent |
|---|---|
| Asphalt (SP ~140-160° F.) | 15-20 |
| MS Polymer S203H - Kaneka | 15-20 |
| MS Polymer S303H - Kaneka | 8-12 |
| Diethylhexyl Phthalate | 15-22 |
| GE A-1120 Aminosilane | 0-0.2 |
| Lowinox 22M46, hindered phenol | 0-0.4 |
| Dibutyltin Acetylacetonate | 0-0.4 |
| GE A-171 Vinyl Silane | 0-0.5 |
| Calcium Carbonate (5-10 micron Piqua) | 0-40 |
| Crayvallac Super, polyamide | 0-2 |

Example E

| Component | Weight Percent |
|---|---|
| Asphalt (SP ~145-155° F.) | 16-18 |
| MS Polymer S203H - Kaneka | 17-20 |
| MS Polymer S303H - Kaneka | 8-11 |
| Diethylhexyl Phthalate | 19-22 |
| GE A-1120 Aminosilane | 0.01-0.1 |
| Lowinox 22M46, hindered phenol | 0.05-0.35 |
| Dibutyltin Acetylacetonate | 0.1-0.4 |
| GE A-171 Vinyl Silane | 0.05-0.3 |
| Calcium Carbonate (5-10 micron Piqua) | 20-35 |
| Crayvallac Super, polyamide | 0.4-1.2 |

As set forth in Example E, the asphalt was formed by a blend of PDA hard base and Roofing Flux. In the examples set forth above, MS Polymer S203H and MS Polymer S303H are polymers that include silyl-terminated polyether. These two products are available from Kaneka Corporation. As can be appreciated, other or additional silyl-terminated polymers can be used (e.g., MAX923, MAX951, SAX350, SAT030, SAT010, SAX400, etc.). Diethylhexyl phthalate is a plasticizer. As can be appreciated, other or additional plasticizers can be used (dioctyl phthalate, diisononyl phthalate, diisodecyl phthalate, etc.). A-1120 is an aminosilane offered by GE Chemical. The aminosilane is used as an adhesion promoter. As can be appreciated, other or additional aminosilanes can be used (e.g., A-2120, etc.). Lowinox 22M46 is a non-discoloring, non-staining sterically hindered bis-phenol that is offered by Great Lakes Polymer Additives. Lowinox 22M46 is used as an antioxidant. As can be appreciated, other or additional antioxidants can be used. Dibutyltin Acetylacetonate is used as an organotin catalyst. This compound is available from Harwick Standard Distribution. As can be appreciated, other or additional catalysts can be used (e.g., UL-2 by GE, UL-4 by GE, SUL-4 by GE, SUL-11A by GE, UL-22 by GE, UL-24 by GE, UL-28 by GE, UL-29 by GE, UL-32 by GE, UL-38 by GE, etc.). A-171 is a vinyl silane offered by GE Chemical. A-171 is used as a dehydration agent. As can be appreciated, other or additional dehydration agents can be used (e.g., A-151, A-2171, etc.). Calcium Carbonate is used as a filler and reinforcing pigment. As can be appreciated, other or additional fillers and/or pigments can be used (e.g., carbon black, silica, calcium phosphate, dolomite, titanium dioxide, etc.) Crayvallac Super is a polyamide offered by Cray Valley. Crayvallac Super is used as a thixotropic agent. As can be appreciated, other or additional thixotropic agents can be used (e.g., Crayvallac Ultra, Crayvallac Extra, etc.).

In addition to the components identified in the non-limiting examples, additional components can be included in the bitumen based adhesive. Such additional components include, but are not limited to, compatibilizer, tackifier, stabilizer, antioxidant, ultraviolet absorber, metal deactivator, light stabilizer, amine type radical chain inhibitor, phosphorus-containing peroxide decomposer, lubricant, foaming agent, antifoaming agent flame retardant and/or antistatic agent.

The bitumen based adhesive is prepared by first heating the bitumen material and then mixing the silylated polymer and/or silyl-terminated polymer in the bitumen. When a plasticizer is included in the bitumen based adhesive, the plasticizer is typically mixed with the bitumen prior to the addition of the silylated polymer and/or silyl-terminated polymer. The manufacture of a bitumen based adhesive in accordance with Example E is set forth as follows. An asphalt having a softening point of about 140-160° F., and typically about 145-155° F. is prepared. The asphalt can be prepared by mixing together hard asphalt and roofing flux in a weight percent ratio of about 2-5:1, and typically about 2.5-3.5:1. Generally the asphalt is stirred and/or mixed for about 5-75 minutes at a temperature of about 170-190° F. After the hard asphalt and roofing flux are blended together to form an asphalt having the desired softening point or a single type of asphalt having the desired softening point has been stirred and melted, the asphalt is mixed with about an equal amount of diethylhexyl phthalate plasticizer. Typically the weight percent ratio plasticizer to asphalt in the mixture is about 0.8-1.2:1, and more typically about 0.95-1.05:1. The mixture is mixed together under sufficient heat to as to maintain the mixture above the softening point of the mixture. Generally the mixture is mixed at a temperature of about 170-190° F. for about 5-100 minutes. The mixture can be mixed under a vacuum; however, this is not required. Once the plasticizer and asphalt have been properly mixed to form an asphalt based mixture, the dried calcium carbonate and any remaining plasticizer is added to the asphalt based mixture. The calcium carbonate should be sufficiently dried to eliminate most of the moisture. This mixture is then heated to about 165-180° F. and stirred under a vacuum for about 20-200 minutes. The stirring of the mixture under a vacuum facilitates in eliminating water from the mixture. Once the mixing of these components is completed, the mixture is cooled to about 130-160° F. and the antioxidant and the thixotropic agent are then added to the mixture. The mixture is again mixed under a vacuum for about 30 minutes to facilitate in the removal of water from the mixture. Once the mixture has been properly mixed, the silyl-terminated polyether polymer is added to the mixture and then mixed under a vacuum at about 110-130° F. After this mixing step has been completed, the dehydration agent and adhesion promoter are added to the mixture and mixed for about 2-100 minutes under a vacuum. The catalyst is then added to the mixture and mixed for about 2-30 minutes under a vacuum. The formed bitumen base adhesive is then sealed in a container in a nitrogen environment so as to inhibit or prevent the introduction of moisture into the container prior to sealing the container.

The bitumen based adhesive of the present invention is a low volatile formulation that releases little, if any, volatiles during the curing of the adhesive. As such, the bitumen based adhesive is more environmentally friendly. The bitumen based adhesive is particularly formulated for use on roofing systems; however, the bitumen based adhesive can be on other building structures and/or used in other applications that require adhesives.

In one non-limiting application, the bitumen based adhesive is used on a low slope roof structure. The top of the roofing structure can include a metal surface, preexisting roof membrane, vinyl surface, one or more layers of insulation, etc. Typically the top of the roofing structure is generally flat prior to the application of the bitumen base adhesive; however, this is not required. The top of the roof structure can be cleaned of debris, loose materials, etc. to facilitate in the adhesion provided by the bitumen based adhesive.

Once the top of the roof surface has been prepared, the bitumen based adhesive is then applied to the roof surface. The bitumen based adhesive can have a viscosity that enables the adhesive to be sprayed of mopped over the desired top surface of the roof surface. Alternatively, the bitumen based adhesive can be applied in discrete areas on the roof surface (e.g., applied in spaced beads or strips on the roof surface, etc.).

After the bitumen based adhesive is applied to the roof surface, a single or multiple ply roof membrane (e.g., SBS base sheet, SBS cap sheet, ethylene propylene dimer (EPDM) sheet, polyvinyl chloride (PVC) sheet, polyisobutylene (PIB) sheet, thermoplastic polyolefin (TPO) sheet, etc.), an insulation layer or the like can then be applied to the roof surface. The roof membrane can include a fleece material to facilitate in the bonding of the roof membrane to the bitumen based adhesive; however, this is not required. After the roof membrane or insulation layer is applied to the bitumen based adhesive, the adhesive is allowed to cure at ambient temperatures. The natural moisture in the air combination with the catalyst in the adhesive will promote the substantially complete curing of the adhesive in less than about 3 days, and typically about 0.5-48 hours; however, longer or shorter curing times can occur in certain environments and/or applications of the adhesive.

The bitumen based adhesive of the present invention generates little, if any, toxic vapors during the application or curing of the adhesive. The bitumen based adhesive does not require the immediate application of a roof membrane or insulation layer after the application of the adhesive to a roof surface as compared to existing polyurethane type adhesives. The bitumen based adhesive can be used in normal environments, in relatively low temperature environments (e.g., 35-45° F.), or in relatively high temperature environments (e.g., above 100° F.). The viscosity of the bitumen based adhesive can be adjusted depending a particular application. Typically the viscosity of the bitumen based adhesive is about 20,000-500,000 centipoise (Brookfield RVT, #4 Spindle, 2.5 rpm).

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

We claim:

1. A method of securing a roof membrane or layer of insulation to a roof surface by use of a low volatile adhesive comprising:
   a) applying a bitumen based adhesive to at least a portion of said roofing surface, said bitumen based adhesive having a low volatile content and comprising 19-22 weight percent plasticizer, 16-18 weight percent bitumen, 0.01-0.1 weight percent adhesion promoter, 0.05-0.35 weight percent antioxidant, 0.05-0.3 weight percent dehydration agent, 20-35 weight percent filler, 0.4-1.2 weight percent thixotropic agent and 0.1-0.4 weight percent catalyst and 25-31 weight percent polymer, said polymer includes a compound selected from the group consisting of silylated polyurethane, silylated polyether, silylated polyester, and combinations thereof, said polymer in said bitumen based adhesive having a greater weight percent than said bitumen, said plasticizer in said bitumen based adhesive having a greater weight percent than said bitumen, a weight percent ratio of said polymer to said bitumen in said bitumen based adhesive is at least about 1.05:1, a weight percent ratio of said plasticizer to said bitumen in said bitumen-polymer-plasticizer mixture is at least about 1.01:1;
   b) applying said roof membrane or layer of insulation at least partially over said bitumen based adhesive; and,
   c) at least partially curing said bitumen based adhesive to secure said roof membrane or layer of insulation to said roofing surface.

2. The method as defined in claim 1, wherein said set for curing includes exposing said bitumen based adhesive to moisture in the atmospheric.

3. The method as defined in claim 1, wherein said bitumen has a softening point of about 90-190° F.

4. The method as defined in claim 1, wherein said polymer includes an alpha, omega-telechelic silane-terminated polymer.

5. The method as defined in claim 1, wherein said plasticizer includes a compound selected from the group consisting of dioctyl adipate, dioctyl phthalate, diisononyl phthalate, diisodecyl phthalate, and combinations thereof.

6. The method as defined in claim 1, wherein said bitumen-polymer-plasticizer mixture includes by weight percent:

| | |
|---|---|
| Asphalt | 16-18 |
| Silyl-terminated polymer | 25-31 |
| Diethylhexyl phthalate | 19-22 |
| Aminosilane | 0.01-0.1 |
| Sterically hindered bis-phenol | 0.05-0.35 |
| Dibutyltin acetylacetonate | 0.1-0.4 |
| Vinyl silane | 0.05-0.3 |
| Calcium carbonate | 20-35 |
| Polyamide | 0.4-1.2. |

7. The method as defined in claim 1, wherein said weight ratio of said polymer to said bitumen is 1.15-4:1.

8. The method as defined in claim 7, wherein said weight ratio of said polymer to said bitumen is 1.2-2:1.

9. The method as defined in claim 1, wherein said weight ratio of said plasticizer to said bitumen is 1.1-1.6:1.

10. The method as defined in claim 9, wherein said weight ratio of said plasticizer to said bitumen is 1.15-1.4:1.

11. A method of securing a roof membrane or layer of insulation to a roof surface by use of a low volatile adhesive comprising:
   a) applying a bitumen based adhesive to at least a portion of said roofing surface, said bitumen based adhesive having a low volatile content and comprising bitumen, polymer, plasticizer and additive, said polymer including one or more compounds selected from the group consisting of silylated polyurethane, silylated polyether and silylated polyester, a weight percent of said polymer in said bitumen based adhesive is greater that a weight percent of said bitumen in said bitumen based adhesive, a weight percent of said plasticizer in said bitumen based adhesive is greater than a weight percent of said bitumen in said bitumen based adhesive, said additive including one or more compounds selected from the group consisting of adhesion promoter, antioxidant, dehydration agent, thixotropic agent and catalyst, said bitumen based adhesive comprising 10-30 wt % bitumen, 15-60 wt % silylated polymer/silyl-terminated polymer, 10-30 wt % plasticizer, and up to 10 wt % catalyst;
   b) applying said roof membrane or layer of insulation at least partially over said bitumen based adhesive; and,
   c) at least partially curing said bitumen based adhesive to secure said roof membrane or layer of insulation to said roofing surface.

12. The method as defined in claim 11, wherein said bitumen based adhesive comprises by weight percent:

| | |
|---|---|
| Bitumen | 12-25% |
| Silylated polymer/silyl-terminated polymer | 20-45% |
| Plasticizer | 12-26% |
| Adhesion Promoter | up to 1% |
| Antioxidant | up to 1% |
| Catalyst | up to 1% |
| Dehydration Agent | up to 3% |
| Filler | up to 50% |
| Pigment | up to 50% |
| Thixotropic Agent | up to 10%. |

13. The method as defined in claim 11, wherein said bitumen based adhesive comprises by weight percent:

| | |
|---|---|
| Asphalt | 12-22% |
| Silylated polymer/silyl-terminated polymer | 22-35% |
| Plasticizer | 14-22% |
| Adhesion Promoter | up to 0.5% |
| Antioxidant | up to 0.5% |
| Catalyst | up to 0.5% |
| Dehydration Agent | up to 1.5% |
| Filler | up to 40% |
| Pigment | up to 40% |
| Thixotropic Agent | up to 5%. |

14. The method as defined in claim 11, wherein said bitumen based adhesive comprises by weight percent:

| | |
|---|---|
| Asphalt | 16-18% |
| Silyl-terminated polymer | 25-31% |

| | |
|---|---|
| Diethylhexyl phthalate | 19-22% |
| Aminosilane | 0.01-0.1% |
| Sterically hindered bis-phenol | 0.05-0.35% |
| Dibutyltin acetylacetonate | 0.1-0.4% |
| Vinyl silane | 0.05-0.3% |
| Calcium carbonate | 20-35% |
| Polyamide | 0.4-1.2%. |

15. The method as defined in claim 11, wherein said weight ratio of said polymer to said bitumen is 1.15-4:1.

16. The method as defined in claim 15, wherein said weight ratio of said polymer to said bitumen is 1.2-2:1.

17. The method as defined in claim 11, wherein said weight ratio of said plasticizer to said bitumen is 1.1-1.6:1.

18. The method as defined in claim 17, wherein said weight ratio of said plasticizer to said bitumen is 1.15-1.4:1.

* * * * *